United States Patent
Shu et al.

[11] Patent Number: 5,905,490
[45] Date of Patent: May 18, 1999

[54] GENERATING COLOR-CORRECTION LOOK-UP-TABLE ADDRESSES BY MULTI-LEVEL HALF-TONING

[75] Inventors: Joseph Shu; Chia-Hsin Li, both of San Jose, Calif.

[73] Assignee: Seiko Epson Corporation, Tokyo, Japan

[21] Appl. No.: 08/607,074

[22] Filed: Feb. 26, 1996

[51] Int. Cl.$^6$ ............................................. G09G 5/06
[52] U.S. Cl. ........................................... 345/199; 345/89
[58] Field of Search ................................. 345/199, 155, 345/153, 149, 147, 89; 358/456, 457

[56] References Cited

U.S. PATENT DOCUMENTS

| | | | |
|---|---|---|---|
| 4,739,397 | 4/1988 | Hayashi | 358/80 |
| 4,956,638 | 9/1990 | Larky et al. | |
| 5,555,102 | 9/1996 | Dalton | 358/456 |
| 5,647,026 | 7/1997 | Kwarta | 382/270 |
| 5,673,065 | 9/1997 | DeLeeuw | 345/153 |
| 5,680,526 | 10/1997 | Andresen et al. | 395/131 |
| 5,734,369 | 3/1998 | Priem et al. | 345/155 |
| 5,742,405 | 4/1998 | Spaulding et al. | 358/456 |
| 5,774,577 | 6/1998 | Ueda et al. | 382/162 |

*Primary Examiner*—Mark K. Zimmerman
*Assistant Examiner*—Ronald Laneau
*Attorney, Agent, or Firm*—Eric B. Janofsky

[57] ABSTRACT

In generating instructions for a printer to render a digitally represented image, addresses for a color-correction look-up table that sparsely samples the source-image color space are generated from the source image by multi-level dithering, and no interpolation is performed to generate the color-corrected image from the values thus fetched from the table, even though it samples the source-image color space only sparsely. In a system in which dithering is also used to generate display commands from the corrected image's pixel values, the effective color resolution is essentially the same as that which would have resulted from interpolation instead of table-look-up-input dithering, but the computation cost is significantly less.

28 Claims, 3 Drawing Sheets

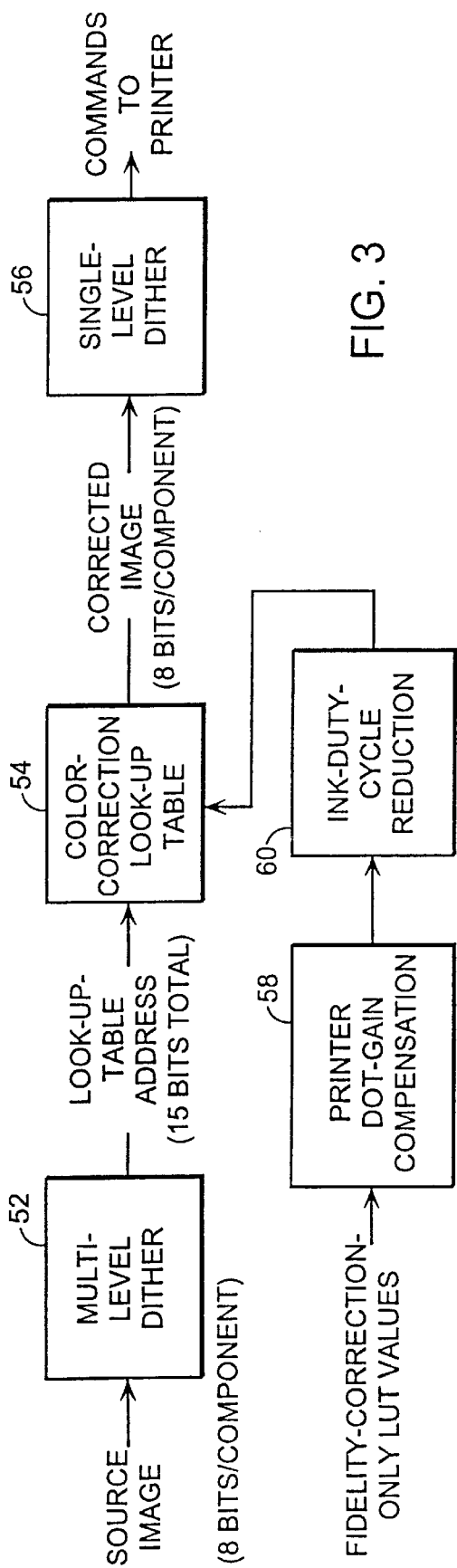

GENERATING COLOR-CORRECTION LOOK-UP-TABLE ADDRESSES BY MULTI-LEVEL HALF-TONING

RELATED APPLICATIONS

Applicants hereby incorporate by reference the following U.S. Patent applications contemporaneously filed and common assigned herewith:

U.S. patent application Ser. No. 08/607,071 of Chia-Hsin Li and Joseph Shu for BANDING NOISE REDUCTION FOR CLUSTERED-DOT DITHER, Assignee's Docket No. AP019.

U.S. patent application Ser. No. 08/607,073 of Joseph Shu and Chia-Hsin Li for CLUSTERED-DOT DITHER WITH WHITE-FLECK SUPPRESSION, Assignee's Docket No. AP018.

U.S. patent application Ser. No. 08/607,075 of Joseph Shu and Chia-Hsin Li for DISPERSED-DOT DITHER WITH IMPROVED LIGHT-COLOR SMOOTHNESS, Assignee's Docket No. AP020.

BACKGROUND OF THE INVENTION

The present invention concerns image display. It has particular application to color correction employed in digital systems for specifying the manner in which a source image is to be rendered.

In most cases, a digitally stored color image is stored in terms of nominal values that a device displaying the image should attempt to approximate as closely as possible. The image may be stored as pixel values or rasterized into a pixel-value organization in the course of displaying it. In either case, the values of the pixels are typically given as three-component vectors. A common format is three eight-bit or twelve-bit words, each of which represents the red, green, or blue component of the image.

Displaying the image typically involves employing corresponding color agents. In a cathode-ray-tube or similar positive-color display, the components respectively correspond to, say, the red, green, and blue screen phosphors that add the corresponding colors to the black background when they are excited. In negative-color systems, such as typical printers, those components correspond to the complementary cyan, magenta, and yellow components, which subtract red, green, and blue, respectively, from the white background.

However, the correspondence between the magnitude of the nominal color-component value and the amount of the corresponding color agent to be employed to yield the most faithful rendition on a given display device is not exact. Whereas equal red, green, and blue component values nominally specify a given intensity of white, a tint would instead result from most displays' equal application of the corresponding coloring agents, e.g., from equal driving of a color CRT's three electron guns or equal duty cycles of an ink jet printer's ink jets. To overcome these effects, the display process usually includes color "correction" to convert nominal values to values that will yield better fidelity in the particular type of display device being used.

What we will refer to here loosely as "color correction" may have additional intended effects, too. For instance, the correction may be performed not simply to compensate for the non-ideal relationships among the coloring agents but also to accommodate various display-device or -medium limitations. In ink-jet printing, for instance, the coloring agent, ink, is dispensed as individual ink dots, and the intensity variation is achieved not by changing the individual dots but by changing the average number of dots per unit area. Because of the dots' shapes and the other factors, this process introduces certain nonlinearities, for which it is desirable to compensate by a "correction" in the requested color. Also, different papers or other print media may be susceptible to "bleeding" to a greater or lesser extent, and the color "correction" actually reduces color fidelity by limiting color darkness but thereby preventing excessive bleeding. We will refer to all of these as "color correction," their common characteristic being the need to convert from a nominal color to a requested color that will tend to achieve a particular printer- or medium-specific requirement.

The relationship between the nominal color and the levels at which the corresponding color agents should be applied are in most cases quite nonlinear, and many digital systems use look-up tables to perform the conversion. But it is not always considered acceptable to provide a look-up table that will give the optimum conversion exhaustively. The magnitude of the problem can be appreciated by considering a typical system in which the components of the nominal color values are expressed with eight-bit resolution. Eight-bit resolution means that there are 256 possible values for each color component, and since there are three components, eight-bit resolution results in $256^3$ possible colors, which is over 16 million. So the color-correction table could require 16 megabytes of memory.

In many applications, this is not acceptable, so an often-employed alternative is to provide a much-smaller look-up table that in effect is a sparse sampling of the color space. When the correction for a given color is required, a corrected value is found by interpolating among the table entries closest to the uncorrected color. If the sparseness of the color-space sampling is not excessive, the result can be quite good. But the interpolation process is slow, so this approach can impose a significant speed penalty,

SUMMARY OF THE INVENTION

We have found a way of employing a small look-up table, corresponding to a sparse sampling of the color space, with a considerably lower speed penalty than interpolation imposes. Our approach is particularly applicable to systems that employ digital half-toning in generating display commands.

Most computer-driven printing devices, such as laser, dot-matrix, and ink-jet printers, operate in a binary fashion: the output medium is divided into a number of pixels, and the printing device can only print a dot at the pixel location or leave it blank: there ordinarily is no dot-size or -intensity choice. In the case of monochrome printers, all of the dots are printed in a single color. In a color printer, the same pixel can receive various combinations of the printer's basic color-component dots (e.g. cyan and/or magenta and/or yellow dots), but, again, each component color has only two values: printed or not.

To render the underlying, high-value-resolution image with such a low-value-resolution device, the high-value-resolution image must be converted into a binary-valued image pattern that the human visual system will tend to integrate to create an illusion of the higher-value-resolution source image. The half-toning process employed in printing for generations performs such a conversion.

A widely employed approach to performing half-toning digitally is called "ordered dithering." Elements of a dither array of predetermined and generally different threshold values are associated with respective image pixels: the array conceptually overlies the image pixel array. If the dither array is smaller than the image array, the dither array is replicated and "tiles" it to produce a repetitive pattern. Each pixel thus has two values conceptually associated with it, namely, the requested pixel tonal value and the corresponding dither-array element. These two values' comparison yields that pixel's value in the output, binary-valued image.

Since in such systems the dithering employed to generate the display-system commands limits high-spatial-frequency response in any case, our invention uses multi-level half-toning ahead of the table-look-up operation and dispenses with the interpolation step afterward. Just as the half-toning employed in the display-command generation achieves the effect of relatively fine color resolution from a device that inherently operates at a much coarser resolution, performing multi-level half-toning ahead of the table-look-up operation effectively extracts a high level of output resolution from a look-up table whose resolution is inherently much coarser. The half-toning process can be performed much more rapidly than interpolation, so we obtain a considerable storage-requirement savings with only a very modest speed cost.

BRIEF DESCRIPTION OF THE DRAWINGS

The following discussion of the invention refers to the accompanying drawings, of which:

FIG. 3 is a block diagram that depicts the processing performed by the printer driver of FIG. 2; and FIG. 4 depicts a dither matrix employed in practicing the present invention's teachings.

DETAILED DESCRIPTION OF AN ILLUSTRATIVE EMBODIMENT

As the invention description proceeds, it will become apparent that the invention can be embodied in dedicated circuitry designed particularly to implement the invention's teachings. Such an arrangement can be included within a printer that receives instructions in terms of high-resolution nominal colors or gray-scale values, and the dedicated circuitry can be designed to convert the requested values to the on-and-off or other low-value-resolution instructions required to render the requested image. But the invention will more typically be implemented by a general-purpose machine, such as a personal computer operating as a printer driver, whose purpose is to convert an image expressed in nominal color values into display-device commands that specify the low-level, typically on-or-off operation of a printer that the computer controls.

Figure 1:
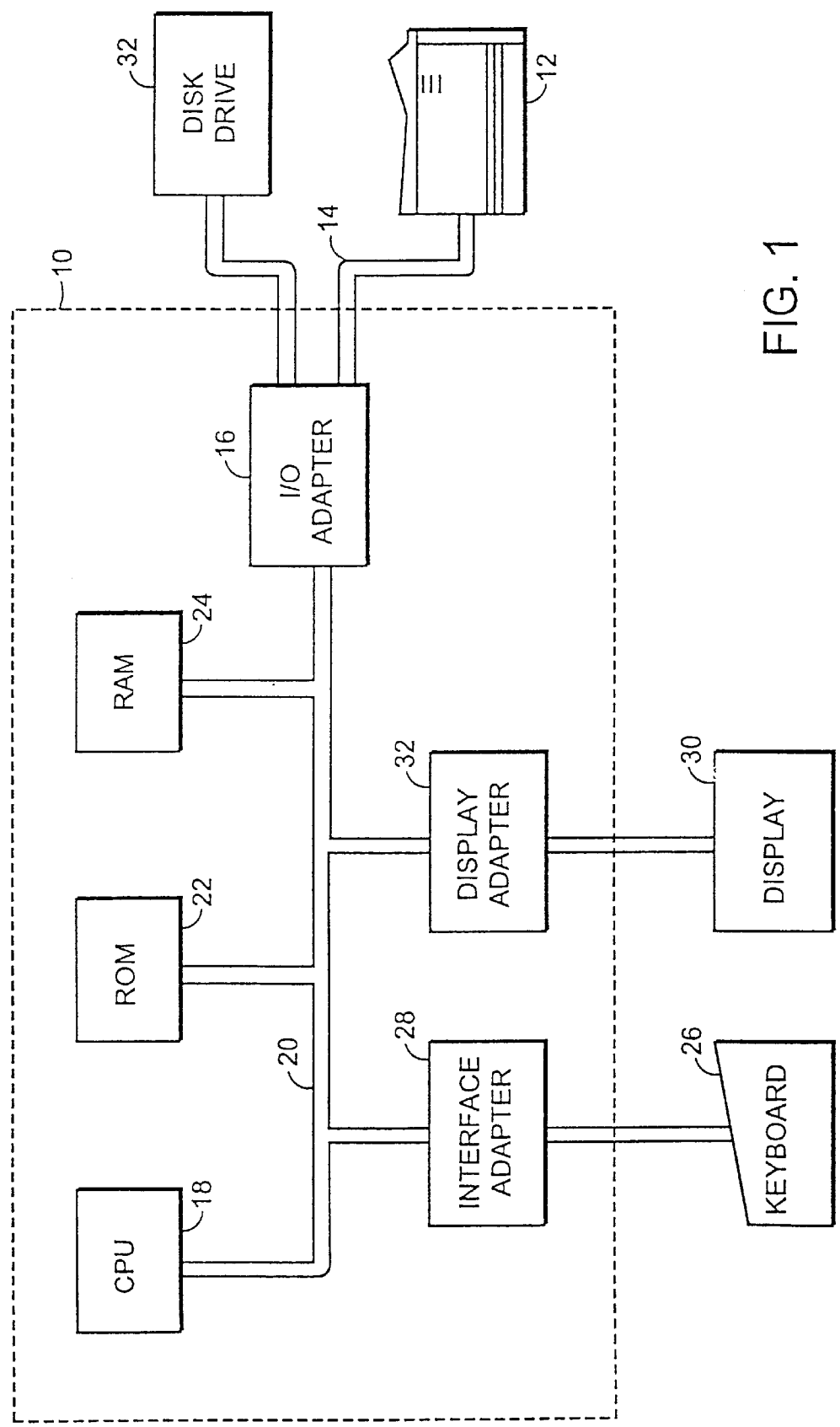
FIG. 1 is a block diagram from a hardware prospective of a typical system employing the present invention's teachings.

FIG. 1 depicts a typical hardware environment. A personal computer 10 sends a display device such as an ink-jet printer 12 low-level instructions, i.e., instructions that specify which individual display-medium pixels should receive dots. The drawing depicts the printer 12 as receiving these instructions by way of an appropriate channel 14. Computers that are capable of practicing the present invention come in a wide variety of configurations, and FIG. 1 depicts one in which channel 14 is provided by an input-output adapter 16 with which a central processing unit 18 communicates by way of an internal bus 20.

Of course, the central processing unit 18 will typically fetch data and instructions at various times from a variety of sources, such as solid-state read-only and read-write memories 22 and 24. FIG. 1 also depicts the computer 10 as communicating, as is typical, with a keyboard 26 by way of an interface adapter 28.

The present invention particularly concerns display devices within this environment, and this connection FIG. 1 depicts the central processing unit 18 as being coupled to a cathode-ray-tube display 30 by a display adapter 32. The computer 10 can employ the present invention's teachings not only to drive printer 12 but also to form an image on the cathode-ray-tube display 30; the broader aspects of the invention are applicable to any pixel-organized display device. But its use on display devices of the cathode-ray-tube type will be infrequent, because present-day cathode-ray-tube computer monitors such as display 30 are capable of greater value resolution than the simple on-or-off values of which most printers are capable. Although half-toning can be practiced in a conversion from a high value resolution to any lower value resolution, not merely to binary representations only, the value resolution of which most monitors are currently capable is usually considered adequate, and half-toning is not required. Nonetheless, the present invention's teachings are not limited to ink-jet or other printers, but instead are applicable to digital pixel-oriented display devices generally.

In the typical situation, the computer 10 implements the present invention's teachings by acting as a printer driver. The instructions that configure the computer to perform this function are usually contained in the operating-system software transferred to the computer's disc drive 32 and stored in a disc that the drive contains. Often, the driver software will have been loaded into the computer system from a diskette or CD-ROM. In any event, the computer 10 reads the printer-driver instructions from the disc drive in most cases and then performs the below-described functions to implement the present invention's teachings.

Figure 2:
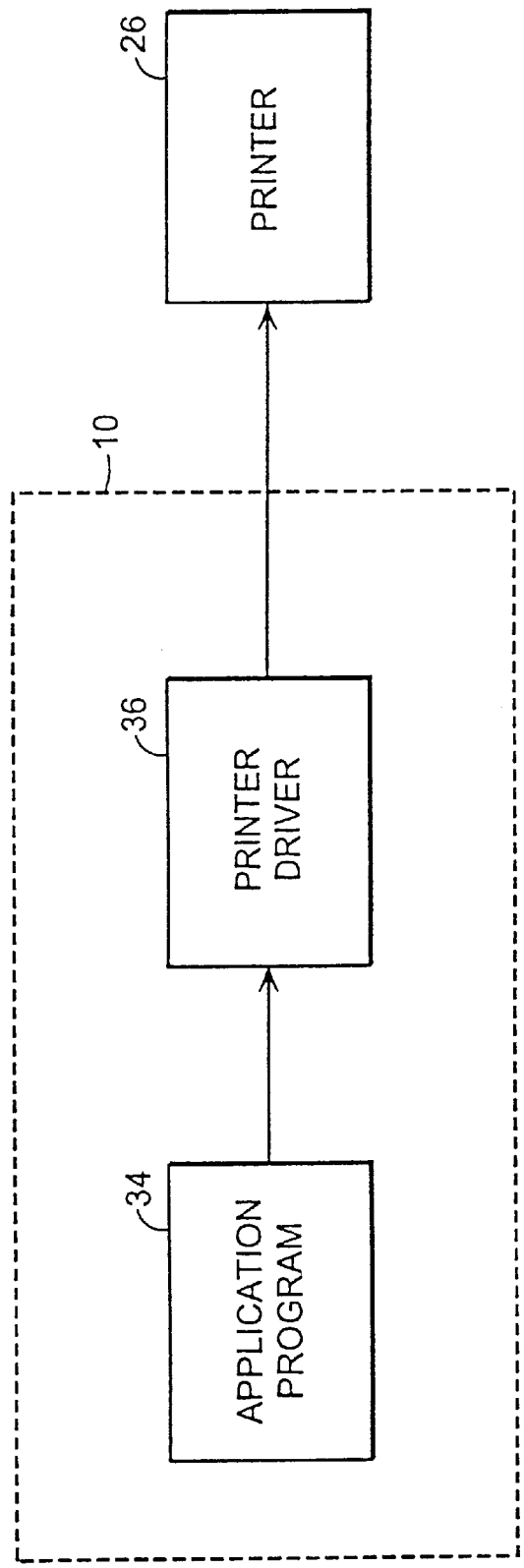
FIG. 2 is a block diagram that depicts the same system from a software standpoint.

FIG. 2 depicts the typical situation from more of a software standpoint. Typically, the present invention's teachings will come into play when the computer 10 is operating a user's application program 34 and that program makes a system call requesting that an image be printed. The requested operation is carried out by a printer driver, which is usually considered to be part of the operating system but is specific to the designated printer. The printer driver's purpose is to convert a device-independent representation of the image into low-level printer instructions to the printer that will render that image as faithfully as the printer's limitations permit.

FIG. 3 depicts the part of the printer driver that provides the illustrated embodiment's environment. A source image of twenty-four bits per pixel, i.e., eight bits per color component, is subjected to multi-level half-toning in a step represented by block 52 and described further by reference to FIG. 4. One type of multi-level half-toning can be performed by conceptually overlaying a dither matrix of the type shown in FIG. 4 on a four-pixel-by-four-pixel region of the display and so replicating that dither matrix as to "tile" the remainder of the display. FIG. 4 gives the dither-matrix-element values in hexadecimal notation, for reasons that will presently become apparent. As FIG. 3 indicates, each input-image color component includes eight-bit values corresponding to respective ones of the pixels that the dither matrix overlies.

Inspection of the dither matrix's values reveals that they extend from 0 through 15: any can be represented in four bits. In one way of implementing the dithering process, the dither-matrix element corresponding to a given pixel is added to each of the eight-bit values representing one of the three components of that pixel's color. The addition can result in bit growth, so the result for each component is eight bits plus potentially a carry bit. The least-significant four bits of each resultant augmented eight-bit component are then discarded, typically by a four-position right shift. The remaining bits of all three components are then used to address a 17×17×17 color-correction memory in a step represented by block 54 of FIG. 3. (The carry bits are responsible for the fact that the look-up table has 17×17×17 locations rather than 16×16×16: if an augmented color has no carry bite, it addresses a location in a 16×16×16 segment.)

Now consider the result of so addressing the look-up table. Let us consider, for example, a region of the source image whose RGB values in hexadecimal terms are uniformly (28, 40, 3D). When the red component's value is augmented in the various pixels conceptually overlaid by FIG. 4's dither matrix, the resultant values will range, in hexadecimal terms, from 028 through 037. And when the four least-significant bits are shifted out, the result will be 02 in half the cases and 03 in the other half. For the green component, which has a value of 40, the augmented value will range from 040 to 04F, so discarding the four least-significant bits always results in a value of 04. And the augmented value of the blue component will range from 03D to 04C. The resultant truncated value is 03 one-eighth of the time and 04 seven-eighths of the time. So the look-up-table output for different pixels in that region will be various of the corrected colors that the look-up table contains for the nominal colors (20, 40, 30), (20, 40, 44), (30, 40, 30), and (30, 40, 40). The impression formed by the eye's integrating effect over a region displayed with those colors approximates the impression caused by uniformly displaying the result of interpolating among them, yet that impression is achieved with much less computation than actual mathematical interpolation would have required.

Of course, in obtaining the effective color-correction resolution in this manner, we have eliminated some spatial-resolution information. But this does not matter, since that position resolution would have been lost anyway in the half-toning used to generate the printer instructions. Specifically, operating the printer requires collapsing the color-component resolution for a single pixel not just to the four-bit resolution employed in addressing the look-up table but rather to the single-bit resolution used to tell the printer whether to apply a dot of that component at the indicated pixel. To achieve this result requires further half-toning, in a step represented by block 56 of FIG. 3, and typically with a much larger dither matrix so as to achieve a relatively fine color resolution at the expense of position resolution. Therefore, the computation savings that we obtain comes at essentially no cost in position resolution.

The simple dither matrix of FIG. 4 is an example of a matrix that results in what is known in the art as dispersed-dot ordered dither. Dispersed-dot-dither matrices are usually much larger than the FIG. 4 matrix and have a much greater range of values so as to provide the possibility of much greater apparent color-value resolution in the typical single-level-dither situation. But the FIG. 4 matrix still exhibits to a degree the salient feature of a dispersed-dot dither matrix, which is that the high-valued matrix elements tend to be near low-valued matrix elements, and high and low values are both well dispersed about the matrix.

Because of certain factors not important here, it is sometimes desired to employ other types of digital half-toning instead. One type is clustered-dot dithering, which is distinguished by a value pattern just the opposite of that which characterizes dispersed-dot dither matrices. Specifically, clustered-dot dither matrices tend to have high element values clustered together. They also cluster low-valued elements. The patterns are so arranged that the pixels "turned on" for a given uniformly colored region form clusters that are bigger or smaller in accordance with the color's intended darkness; the effect is similar to that of the traditional halftone screen. Another common half-toning technique is referred to as error diffusion. Error diffusion differs from the clustered- and dispersed-dot dither in that the half-toning process's quantization error at one pixel is taken into account in arriving the thresholds for adjacent pixels. Any of these types, or combination of them, can be used in the present invention. However, although it was observed above that the present invention can be employed with little position-information loss as a practical matter, care must be exercised if this characteristic is to be maintained when clustered-dot dithering is used both before and after the table-look-up operation.

Specifically, it was noted above that clustered-dot dither creates clusters of printed dots. For a given matrix, these dots have a given spatial frequency. If clustered-dot dithering is used both in the pre-table-look-up dithering and in the output dithering, position-information loss is minimized when the spatial frequencies associated with the two matrices are equal or one is harmonic of the other. Also, the matrices should be so aligned that all of one matrix's dark-cluster centers coincide with dark-cluster centers of the other matrix. We find that this method produces the best results when the spatial frequency associated with the pre-table-look-up dithering is half the spatial frequency of the output dithering.

This invention can be employed in correction tables directed to a great many purposes. To signify that, we have included in FIG. 3 two further blocks 58 and 60, which do not represent operations performed in real time to correct colors. Instead, they represent steps that could have been performed in arriving at the look-up table contents. In practicing the invention, for instance, we begin with look-up-table values whose purpose is simply to increase color-rendition fidelity; these values simply take into account the non-ideal colors of the inks that various printers employ. We modify these look-up table values, in a step represented by block 58, to take into account the effects that ink-dot shapes, which tend to differ for different media, have on apparent color intensity. We also modify the look-up table entries, in a step represented by block 60, to take into account the tendency of the ink to bleed on the paper currently being employed. Of course, the invention can be used with look-up tables intended for some, none, or all of these and other effects.

Also, although the above-described approach, namely, simply discarding the least-significant four bits, is a particularly convenient way of performing the multi-level dithering, those skilled in the art will recognize that multi-level dithering can be performed in many other ways. For example, we have employed a 26×26×26 look-up table for eight-bit input values by adding matrix values that extend from 0 to 10 and then dividing by 26.

Moreover, although the look-up table in the above example samples the color space evenly—it has entries for hexadecimal component values of 00, 10, 20, 30, etc.—the present invention does not require such an even-sampling approach in general. And the dither matrices employed for the different color components—or even for different ranges of the same component—do not have to be the same.

It is thus apparent that the present invention can be employed in a wide range of embodiments and thus constitutes a significant advance in the art.

We claim:

1. A method of operating a display device to render a source image consisting of relatively fine-resolution pixel values comprising the steps of:
   (a) generating a conversion-input image consisting of coarser-value-resolution pixel values by performing multi-level half-toning operation on the source image;
   (b) obtaining a converted image by employing the pixel values of the conversion-input image to address a look-up table containing conversion values;
   (c) performing a second halftoning operation of the converted image from step (b); and
   (d) operating the display device to generate a display in accordance with the halftoned converted image of step (c).

2. A method as defined in claim 1 wherein the step of operating the display device comprises:
   transmitting display-command values to the printer.

3. A method as defined in claim 2 wherein the source image is a color image.

4. A method as defined in claim 2 wherein the multi-level and second half-toning operations are performed in accordance with dispersed-dot dither matrices.

5. A method as defined in claim 2 wherein:
   the first and second half-toning operations are performed in accordance with clustered-dot dither matrices having respective cluster spatial frequencies; and
   one of those spatial frequencies is equal to or a harmonic of the other.

6. A method as defined in claim 5 wherein the source image is a color image.

7. A method as defined in claim 5 wherein the cluster spatial frequency of the dither matrix in accordance with which the multi-level half-toning operation is performed is half the cluster spatial frequency of the dither matrix in accordance with which the second half-toning operation is performed.

8. A method as defined in claim 1 wherein the source image is a color image.

9. An apparatus for operating an image-presenting mechanism to present a source image, which apparatus comprises:
   A) image-revision circuitry responsive to electrical source-image signals representing the source image for performing a sequence of at least one image-revision step, in which sequence each image-revision step receives an input image consisting of input pixels and produces therefrom an output image consisting of output pixels, the input image of the first image-revision step is the source image, the input image of any subsequent image-revision step is the output image of the preceding image-revision step, and one said image-revision step is a correction operation in which:
      i) the input image of the correction operation consists of relatively fine-resolution pixel values; and
      ii) the correction operation comprises the steps of:
         a) generating a conversion-input image consisting of coarser-value-resolution pixel values by performing a multi-level half-toning operation on the correction operation's input image; and
         b) obtaining the correction operation's output image by employing the pixel values of the conversion-input image to address a look-up table containing conversion values;
         c) performing a second half-toning operation of the output image of step (b); and
   B) output circuitry responsive to the image-revision circuitry for applying to the image-presenting mechanism electrical command signals that represent the output image produced by last image-revision step.

10. An apparatus as defined in claim 9 wherein:
    A) the multi-level and second half-toning operations are performed in accordance with clustered-dot dither matrices having respective cluster spatial frequencies; and
    B) one of those spatial frequencies is equal to or a harmonic of the other.

11. An apparatus as defined in claim 10 wherein the cluster spatial frequency of the dither matrix with which the multi-level half-toning operation is performed is half the cluster spatial frequency of the dither matrix in accordance with which the further half-toning operation is performed.

12. An apparatus as defined in claim 10 wherein the source image is a color image.

13. An apparatus as defined in claim 9 wherein the multi-level and second half-toning operations are performed in accordance with dispersed-dot dither matrices.

14. An apparatus as defined in claim 9 wherein the source image is a color image.

15. An imaging apparatus comprising:
    A) an image-presenting mechanism for applying an imaging agent to a medium in accordance with electrical command signals applied thereto;
    B) image-revision circuitry responsive to electrical source-image signals representing the source image for performing a sequence of at least one image-revision step, in which sequence each image-revision step receives an input image consisting of input pixels and produces therefrom an output image consisting of output pixels, the input image of the first image-revision step is the source image, the input image of any subsequent image-revision step is the output image of the preceding image-revision step, and one said image-revision step is a correction operation in which:
       i) the input image of the correction operation consists of relatively fine-resolution pixel values; and
       ii) the correction operation comprises the steps of:
          a) generating a conversion-input image consisting of coarser-value-resolution pixel values by performing a multi-level half-toning operation on the correction operation's input image; and
          b) obtaining the correction operation's output image by employing the pixel values of the conversion-input image to address a look-up table containing conversion values;
          c) performing a second half-toning operation of the output image of step (b); and
    B) output circuitry responsive to the image-revision circuitry for applying to the image-presenting mechanism electrical command signals that represent the output image produced by last image-revision step.

16. An imaging apparatus as defined in claim 15 wherein:
    A) the multi-level and second half-toning operations are performed in accordance with clustered-dot dither matrices having respective cluster spatial frequencies; and
    B) one of those spatial frequencies is equal to or a harmonic of the other.

17. An imaging apparatus as defined in claim 16 wherein the cluster spatial frequency of the dither matrix with which the multi-level half-toning operation is performed is half the cluster spatial frequency of the dither matrix in accordance with which the second half-toning operation is performed.

18. An imaging apparatus as defined in claim 16 wherein the source image is a color image.

19. An imaging apparatus as defined in claim 15 wherein the multi-level and second half-toning operations are performed in accordance with dispersed-dot dither matrices.

20. An imaging apparatus as defined in claim 15 wherein the source image is a color image.

21. An imaging apparatus as defined in claim 15 wherein image-presenting mechanism is a printer.

22. A storage medium containing instructions readable by a computer to configure the computer to function as a printer driver for operating a printer to present a source image, which printer driver includes:

A) image-revision circuitry responsive to electrical source-image signals representing the source image for performing a sequence of at least one image-revision step, in which sequence each image-revision step receives an input image consisting of input pixels and produces therefrom an output image consisting of output pixels, the input image of the first image-revision step is the source image, the input image of any subsequent image-revision step is the output image of the preceding image-revision step, and one said image-revision step is a correction operation in which:
  i) the input image of the correction operation consists of relatively fine-resolution pixel values; and
  ii) the correction operation comprises the steps of:
    a) generating a conversion-input image consisting of coarser-value-resolution pixel values by performing a multi-level half-toning operation on the correction operation's input image; and
    b) obtaining the correction operation's output image by employing the pixel values of the conversion-input image to address a look-up table containing conversion values;
    c) performing a second half-toning operation of the output image of step (b); and B) output circuitry responsive to the image-revision circuitry for applying to the image-presenting mechanism electrical command signals that represent the output image produced by last image-revision step.

23. A storage medium as defined in claim 22 wherein:

A) the multi-level and second half-toning operations are performed in accordance with clustered-dot dither matrices having respective cluster spatial frequencies; and B) one of those spatial frequencies is equal to or a harmonic of the other.

24. A storage medium as defined in claim 23 wherein the cluster spatial frequency of the dither matrix with which the multi-level half-toning operation is performed is half the cluster spatial frequency of the dither matrix in accordance with which the second half-toning operation is performed.

25. A storage medium as defined in claim 23 wherein the source image is a color image.

26. A storage medium as defined in claim 22 wherein the multi-level and further half-toning operations are performed in accordance with dispersed-dot dither matrices.

27. A storage medium as defined in claim 22 wherein the source image is a color image.

28. A method of operating a display device to render a source image consisting of relatively fine-resolution pixel values comprising the steps of:

(a) generating a conversion-input image consisting of coarser-value-resolution pixel values by performing a multi-level dither operation on the source image;

(b) obtaining a converted image by employing the pixel values of the conversion-input image to address a color correction look-up table containing conversion values;

(c) performing a second single level dither operation of the converted image from step (b); and operating the display device to generate a display in accordance with the halftoned converted image of step (c).

* * * * *